United States Patent [19]
Koukal et al.

[11] Patent Number: 5,056,423
[45] Date of Patent: Oct. 15, 1991

[54] DEVICE FOR SUPPLYING FRESH AIR TO THE PASSENGER SPACE OF A VEHICLE

[75] Inventors: Heinz Koukal; Klaus Arold, both of Sindelfingen; Hans Trube, Herrenberg; Gernoth Karioth, Sindelfingen, all of Fed. Rep. of Germany

[73] Assignee: Mercedes-Benz AG, Fed. Rep. of Germany

[21] Appl. No.: 553,620

[22] Filed: Jul. 18, 1990

[30] Foreign Application Priority Data

Jul. 22, 1989 [DE] Fed. Rep. of Germany ....... 3924293

[51] Int. Cl.$^5$ .............................................. B60H 1/28
[52] U.S. Cl. ....................................... 98/2.17; 98/2.11
[58] Field of Search ...................... 98/2.11, 2.16, 2.17

[56] References Cited

U.S. PATENT DOCUMENTS

| | | | |
|---|---|---|---|
| 2,634,671 | 4/1953 | Puidokas | 98/2.17 |
| 3,118,362 | 1/1964 | Suisse | 98/2.17 |
| 3,157,104 | 11/1964 | Hallinger | 98/2.17 X |
| 4,242,951 | 1/1981 | Bemiss | 98/2.16 X |
| 4,722,265 | 2/1988 | Koukal et al. | 98/2.17 |

FOREIGN PATENT DOCUMENTS 1430386 10/1969 Fed. Rep. of Germany ....... 98/2.17
39924 4/1981 Japan ................................... 98/2.16

Primary Examiner—Harold Joyce
Attorney, Agent, or Firm—Evenson, Wands, Edwards, Lenahan & McKeown

[57] ABSTRACT

In a device for supplying fresh air to the passenger space of a vehicle, to ensure an easy filter change, at the same time with the air filter being protected against water, the fresh-air inlet is arranged in the engine hood and the water run-off is arranged on the top side, facing the fresh-air inlet, of a hood-like filter cover covering the air filter. The filter cover is fastened releasably to an air distributor box receving the air filter and carries air throughflow orifices in its casing region. With the engine hood open, the filter cover is freely accessible and can be removed from the air distributor box for the purpose of a filter change.

11 Claims, 1 Drawing Sheet

DEVICE FOR SUPPLYING FRESH AIR TO THE PASSENGER SPACE OF A VEHICLE

BACKGROUND AND SUMMARY OF THE INVENTION

The invention relates to a device for supplying fresh air to the passenger space of a vehicle having a body front end preceding the passenger space in the driving direction and surrounding an engine space coverable by an engine hood, with a fresh-air inlet arranged on the top side of the body front end and with an air distributor box which is located underneath it and which is covered with an air filter towards the fresh-air inlet and is equipped with a water run-off.

In a know ventilation device of this type (German patent specification 1,188,458), the fresh-air inlet is arranged in the body front end underneath the windscreen. The air distributor box is attached by means of its inlet port to the underside of the body sheet and surrounds the fresh-air inlet by means of a gasket located on the end face. The air filter is arranged obliquely in the inlet port. Underneath the filter region located at the rear in the driving direction there is a drop-collecting strip, and in the bottom of the air distributor box there are water run-off orifices. To change the filter, the air distributor box accessible from the engine space has to be removed as a complete unit. The filter change is therefore highly time-consuming and costly, and therefore filtering is restricted to air filtering on dust filters for dirt particles which become contaminated only over a relatively long period of time and which are only slightly sensitive to water. It is not possible to use pollutant filters, for example activated-charcoal filters, which lose their chemical filtering property under wet conditions.

An object on which the invention is based is to improve a device of the type mentioned in the introduction, in such a way that, on the one hand, the filter change can be carried out easily and quickly without a stay in the workshop, and on the other hand, the air filter is protected completely from water.

In a device of the above noted type, this object is achieved by providing an arrangement wherein the fresh-air inlet is arranged in the engine hood and the water run-off is arranged on the top side of a hood like filter cover which covers the air filter facing the fresh-air inlet and is fastened releaseably to the air distributor box and carries air throughflow orifices in its casing region.

In the ventilation device according to the invention, by arranging the fresh-air inlet in the engine bonnet or hood, when this is opened the filter cover according to the invention is exposed and can be removed by hand, without a tool, from the inlet port of the air distributor box. The air filter is thereafter directly accessible and can easily be exchanged. After the filter cover has been reattached, the air filter is portected completely against water. The fresh air entering via the fresh-air inlet with the engine bonnet closed is sucked in via approximately vertically aligned air inflow orifice in the casing of the hood-shaped filter cover. Water flowing in via the fresh-air inlet is conveyed away on the top side of the filter cover. Either filters acting as a dirt filter or so-called pollutant absorption filter can be used as an air filter.

Advantageous embodiments of the ventilation device according to the invention, with expedient development and designs of the invention are illustrated and described below.

In a preferred embodiment of the invention, the so-called fresh-air flaps are assigned to the air inflow orifices in the filter cover. The advantage of this is that air passes through the air filter only when there is a fresh-air requirement, that is to say when fresh air is needed in the passenger space. The service life of the air filter is thereby increased substantially, this being of essential importance especially when pollutant absorption filters are used.

In a further feature of embodiments of the invention, the filter cover, on its top side facing the fresh-air inlet, carries a baffle web which extends round in the manner of a collar and on which is attached an annular mesh which serves as a coarse filter and is inclined towards the center and which, with its end orifice facing away from the baffle web, surrounds the fresh air inlet. The coarse filter serves for clearing particles of dirt and dust from the fresh air, so that the following air filter is subjected to less load, thus contributing to a further increase in the service life. During the filter change, the coarse filter on the removed filter cover can be cleaned in a simple way by means of compressed air.

Other objects, advantages and novel features of the present invention will become apparent from the following detailed description of the invention when considered in conjunction with the accompanying drawings.

DETAILED DESCRIPTION OF THE DRAWINGS

Figure 1:
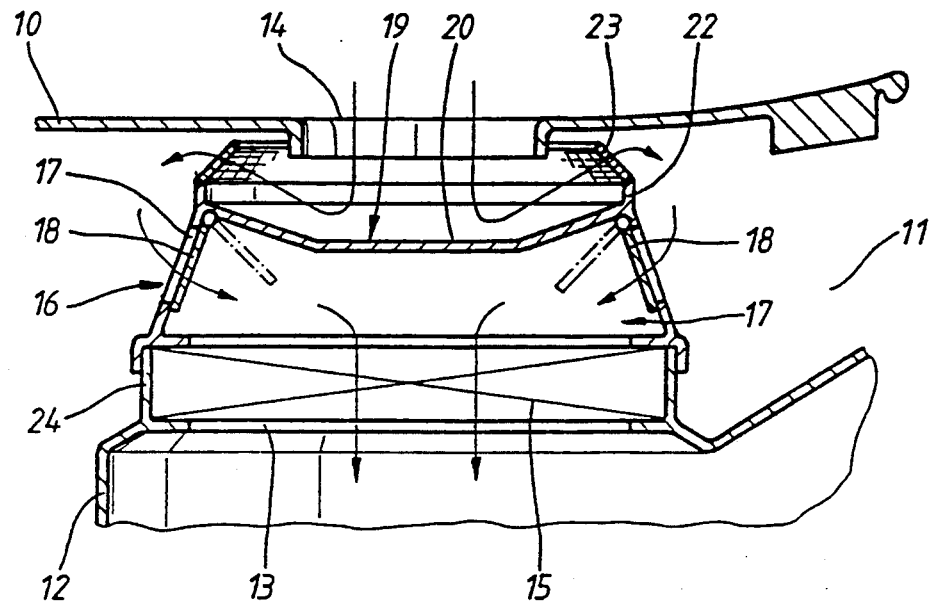
FIG. 1 is a schematic sectional view which shows a cross-section through a ventilation device for a motor vehicle, constructed according to a preferred embodiment of the invention.

In FIG. 1, 10 denotes the engine bonnet or hood which covers the engine space 11 of a motor vehicle, contained in the body front end. The engine space 11 is conventionally followed, in the driving direction, by the passenger cell or the passenger space which is to be supplied with fresh air by means of a ventilation device. The ventilation device arranged in the engine space 11 consists essentially of an air distributor box 12 which is located, with an air inflow orifice 13 left free by a collar-shaped orifice connection 24, underneath a fresh-air inlet 14 in the engine bonnet 10 and which is connected to at least one outlet port (not shown) in the passenger space of the motor vehicle. Held exchangeably in the orifice connection 24 is an air filter 15 which covers the entire approximately rectangular air inflow orifice 13.

Figure 2:
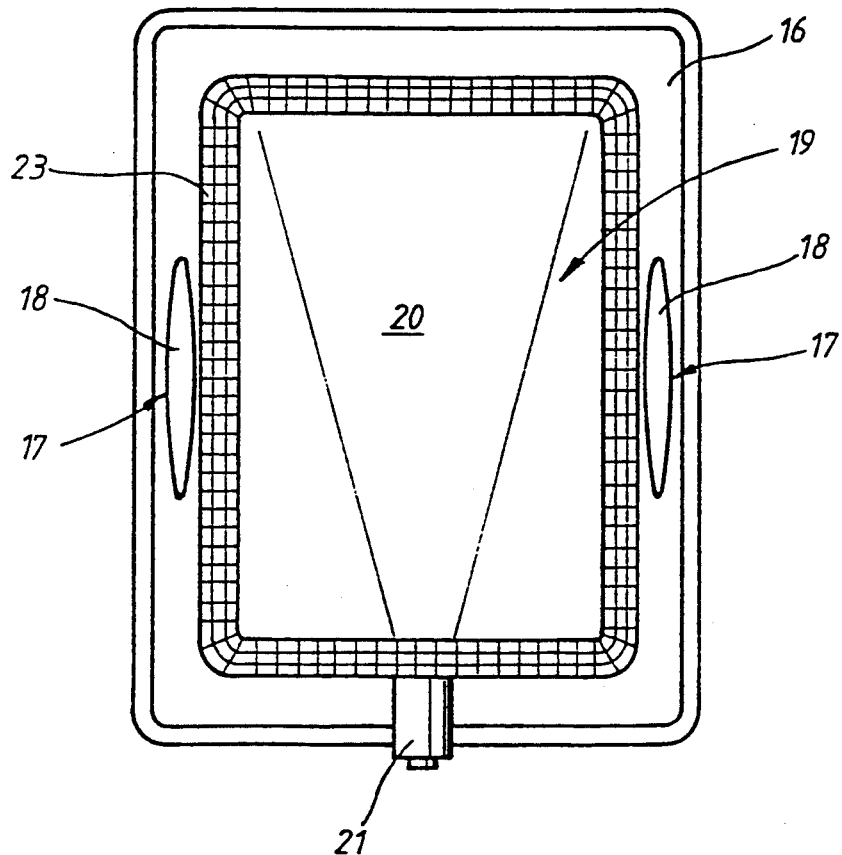
FIG. 2 shows a top view of the ventilation device of FIG. 1 without the engine bonnet and air distributor box.

A filter cover 16 is attached to the orifice connection 24 of the air distributor box 12 and is fastened releaseably to the air distributor box 12, for example by spring clips (not shown). The filter cover 16 is a hood-like design and, in its vertical slightly inclined casing region, carries on opposite sides two air throughflow orifices 17 which can each be selectively opened or closed by means of an air flap 18. On the top side of the filter cover 16 facing the fresh-air inlet 14 there is a water run-off 19 in the form of a gutter 20 extending centrally along the largest dimension of the filter cover 16 and descending, with a simultaneous narrowing, from one side of the cover to the other. At its narrowed end, the gutter 20 opens into a tubular run-off connection 21 projecting beyond the cover edge (FIG. 2). Furthermore, on the top side of the filter cover 16 facing the fresh-air inlet 14, there extends along the cover edge a baffle web 22 which projects in the manner of a collar and on which a mesh 23 serving as a coarse filter is attached. The mesh 23 is of approximately trapezoidal cross-section and, with its inward-pointing end face facing away from the baffle web 22, surrounds the fresh-air inlet 14 in the engine bonnet 11.

When the two air flaps 18 are opened, fresh air passes via the fresh-air inlet 14, the mesh 23 and via the free air throughflow orifices 17 into the hood interior of the filter cover 16. From here, the air freed of moisture passes through the air filter 15 and, cleared of dust or pollutants, flows in the air distributor box 12 to the passenger space of the motor vehicle. The air flow is symbolized by flow arrows in FIG. 1.

The filter purified fresh-air does not have to be fed directly to the passenger space, but can previously be heated in a heating system or cooled in an air conditioning system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Device for supplying fresh air to the passenger space of a vehicle having a body front end preceding the passenger space in the driving direction and surrounding an engine space coverable by an engine hood, comprising:

a fresh-air inlet arranged on a top side of the body front end, and an air distributor box which is located underneath the fresh-air inlet which is covered with an air filter towards the fresh-air inlet and is equipped with a water run-off, wherein the fresh-air inlet is arranged in the engine hood and the water run-off is arranged on the top side of a hood-like filter cover which covers the air filter facing the fresh-air inlet and is fastened releasably to the air distributor box and carries air throughflow orifices in its casing region.

2. Device according to claim 1, wherein the air distributor box has a collar-shaped orifice connection which projects towards the fresh-air inlet and surrounds an air inflow orifice and in which the air filter is located removably and on which the filter cover can be attached releaseably.

3. Device according to claim 1, wherein each air throughflow orifice in the filter cover is assigned a pivotable air flap for its arbitrary closing or opening.

4. Device according to claim 1, wherein the filter cover, on its top side facing the fresh-air inlet, carries a baffle web which extends around in the manner of a collar and on which is attached an annular mesh which serves as a coarse filter and is inclined towards the center and which, with its end face facing away from the baffle web, surrounds the fresh-air inlet.

5. Device according to claim 1, wherein the filter cover is of approximately rectangular shape to match the cross-section of the fresh-air inlet and orifice connection of the air distributor box, and wherein the water run-off is formed by a central gutter extending along the largest dimension of the filter cover and descending, with a simultaneous narrowing, from one side of the cover to the other.

6. Device according to claim 5, wherein the gutter opens at its narrowed end into a tubular run-off connection projecting beyond the cover edge.

7. Device according to claim 2, wherein each air throughflow orifice in the filter cover is assigned a pivotable air flap for its arbitrary closing or opening.

8. Device according to claim 3, wherein the filter cover, on its top side facing the fresh-air inlet, carries a baffle web which extends around in the manner of a collar and on which is attached an annular mesh which serves as a coarse filter and is inclined towards the center and which, with its end face facing away from the baffle web, surrounds the fresh-air inlet.

9. Device according to claim 4, wherein the filter cover is of approximately rectangular shape to match the cross-section of the fresh-air inlet and orifice connection of the air distributor box, and wherein the water run-off is formed by a central gutter extending along the largest dimension of the filter cover and descending, with a simultaneous narrowing, from one side of the cover to the other.

10. Device according to claim 8, wherein the filter cover is of approximately rectangular shape to match the cross-section of the fresh-air inlet and orifice connection of the air distributor box, and wherein the water run-off is formed by a central gutter extending along the largest dimension of the filter cover and descending, with a simultaneous narrowing, from one side of the cover to the other.

11. Device according to claim 10, wherein the gutter opens at its narrowed end into a tubular run-off connection projecting beyond the cover edge.

* * * * *